US009989347B2

(12) United States Patent
Jonas et al.

(10) Patent No.: US 9,989,347 B2
(45) Date of Patent: Jun. 5, 2018

(54) METHOD AND APPARATUS FOR INSPECTING WORKPIECES

(71) Applicant: RENISHAW PLC, Wotton-under-Edge, Gloucestershire (GB)

(72) Inventors: Kevyn B Jonas, Wotton-under-Edge (GB); Ingrid M Östin, Wotton-under-Edge (GB)

(73) Assignee: RENISHAW PLC, Wotton-Under-Edge (GB)

( * ) Notice: Subject to any disclaimer, the term of this patent is extended or adjusted under 35 U.S.C. 154(b) by 44 days.

(21) Appl. No.: 14/890,024

(22) PCT Filed: May 12, 2014

(86) PCT No.: PCT/GB2014/051450
§ 371 (c)(1),
(2) Date: Nov. 9, 2015

(87) PCT Pub. No.: WO2014/181134
PCT Pub. Date: Nov. 13, 2014

(65) Prior Publication Data
US 2016/0146589 A1 May 26, 2016

(30) Foreign Application Priority Data
May 10, 2013 (GB) .................... 1308467.8

(51) Int. Cl.
*G01B 5/008* (2006.01)
*G01B 21/04* (2006.01)
*G01B 5/00* (2006.01)

(52) U.S. Cl.
CPC ........... *G01B 5/008* (2013.01); *G01B 5/0014* (2013.01); *G01B 21/045* (2013.01)

(58) Field of Classification Search
CPC ...................................................... G01B 5/008
(Continued)

(56) References Cited

U.S. PATENT DOCUMENTS

| 4,819,195 A | 4/1989 | Bell et al. |
| 4,949,469 A | 8/1990 | Wachtler |

(Continued)

FOREIGN PATENT DOCUMENTS

| CN | 1639541 A | 7/2005 |
| CN | 1856690 A | 11/2006 |

(Continued)

OTHER PUBLICATIONS

Jul. 25, 2014 International Search Report issued in International Application No. PCT/GB2014/051450.

(Continued)

*Primary Examiner* — G. Bradley Bennett
(74) *Attorney, Agent, or Firm* — Oliff PLC

(57) ABSTRACT

A series of nominally identical workpieces is received from a manufacturing process and measured on a measuring apparatus. They are received at a non-ambient temperature because of heat introduced during the manufacturing process, but they are placed on the measuring apparatus in a repeatable manner, e.g. by a robot, such that their non-ambient temperatures when measured are repeatable. One of the workpieces is measured as a reference workpiece at the non-ambient temperature, and these measurements are compared to calibrated values obtained from an external source, in order to generate an error map or error function. The error map or error function is used to correct measurements of subsequent workpieces of the series which are measured at the repeatable non-ambient temperature.

33 Claims, 5 Drawing Sheets

(58) Field of Classification Search
USPC .............................................. 33/503; 73/1.79
See application file for complete search history.

(56) References Cited

U.S. PATENT DOCUMENTS

| | | | |
|---|---|---|---|
| 5,011,297 | A | 4/1991 | Tittl |
| 5,195,826 | A | 3/1993 | Enderle et al. |
| 5,257,460 | A | 11/1993 | McMurtry |
| 5,426,861 | A | 6/1995 | Shelton |
| 5,446,545 | A | 8/1995 | Taylor |
| 5,594,668 | A | 1/1997 | Bernhardt et al. |
| 5,895,442 | A | 4/1999 | Arndt |
| 6,336,375 | B1 | 1/2002 | McMurtry et al. |
| 6,434,846 | B1 | 8/2002 | McMurtry et al. |
| 7,079,969 | B2 | 7/2006 | Taylor et al. |
| 7,131,207 | B2 | 11/2006 | McFarland |
| 7,376,261 | B2 | 5/2008 | Noda et al. |
| 7,568,373 | B2 | 8/2009 | McMurtry et al. |
| 7,587,840 | B2 | 9/2009 | Sakai et al. |
| 8,115,808 | B2 | 2/2012 | Fricke et al. |
| 8,138,769 | B2 | 3/2012 | Cristini |
| 2005/0000105 | A1 | 1/2005 | Schepperle et al. |
| 2005/0263727 | A1* | 12/2005 | Noda .................... G01B 5/008 250/559.29 |
| 2009/0090013 | A1 | 4/2009 | Hicks |
| 2010/0169721 | A1 | 7/2010 | Chang et al. |
| 2010/0299094 | A1 | 11/2010 | Hsu |
| 2010/0319207 | A1 | 12/2010 | Held |
| 2011/0040514 | A1 | 2/2011 | Kunzmann et al. |
| 2014/0157861 | A1* | 6/2014 | Jonas .................... G01B 5/008 73/1.79 |
| 2017/0082416 | A1* | 3/2017 | Besuchet ............ G01B 21/042 |
| 2017/0089683 | A1* | 3/2017 | Yokoyama ............ G01N 25/16 |

FOREIGN PATENT DOCUMENTS

| | | |
|---|---|---|
| CN | 102629121 A | 8/2012 |
| CN | 102736557 A | 10/2012 |
| DE | 43 38 351 C1 | 1/1995 |
| DE | 4436782 A1 | 4/1995 |
| EP | 0519638 A1 | 12/1992 |
| EP | 0546784 A2 | 6/1993 |
| EP | 1128156 A1 | 8/2001 |
| EP | 1748278 A1 | 1/2007 |
| JP | S57-125812 A | 8/1982 |
| JP | H06-190687 A | 7/1994 |
| JP | H 06229705 A | 8/1994 |
| JP | 2004-028653 A | 1/2004 |
| JP | 2004-138449 A | 5/2004 |
| JP | 2005265700 A | 9/2005 |
| JP | 2011-021962 A | 2/2011 |
| TW | 201037268 A | 10/2010 |
| WO | 88/09915 A1 | 12/1988 |
| WO | 97/46925 A1 | 12/1997 |
| WO | 00/34974 A1 | 6/2000 |
| WO | 00/62015 A1 | 10/2000 |
| WO | 03006837 A1 | 1/2003 |
| WO | 03/074968 A1 | 9/2003 |
| WO | 2004/005849 A1 | 1/2004 |
| WO | 2004063579 A1 | 7/2004 |
| WO | 2005/071350 A1 | 8/2005 |
| WO | 2007/122362 A1 | 11/2007 |
| WO | 2009/013769 A1 | 1/2009 |
| WO | 2011107729 A1 | 9/2011 |
| WO | 2013021157 A1 | 2/2013 |
| WO | 2013140118 A2 | 9/2013 |

OTHER PUBLICATIONS

Jul. 25, 2014 Written Opinion issued in International Application No. PCT/GB2014/051450.
May 16, 2017 Office Action issued in European Patent Application No. 14723876.0.
May 8, 2017 Office Action issued in Chinese Patent Application No. 201480038954.X.
Mar. 6, 2018 Office Action issued in Japanese Patent Application No. 2016-512424.

* cited by examiner

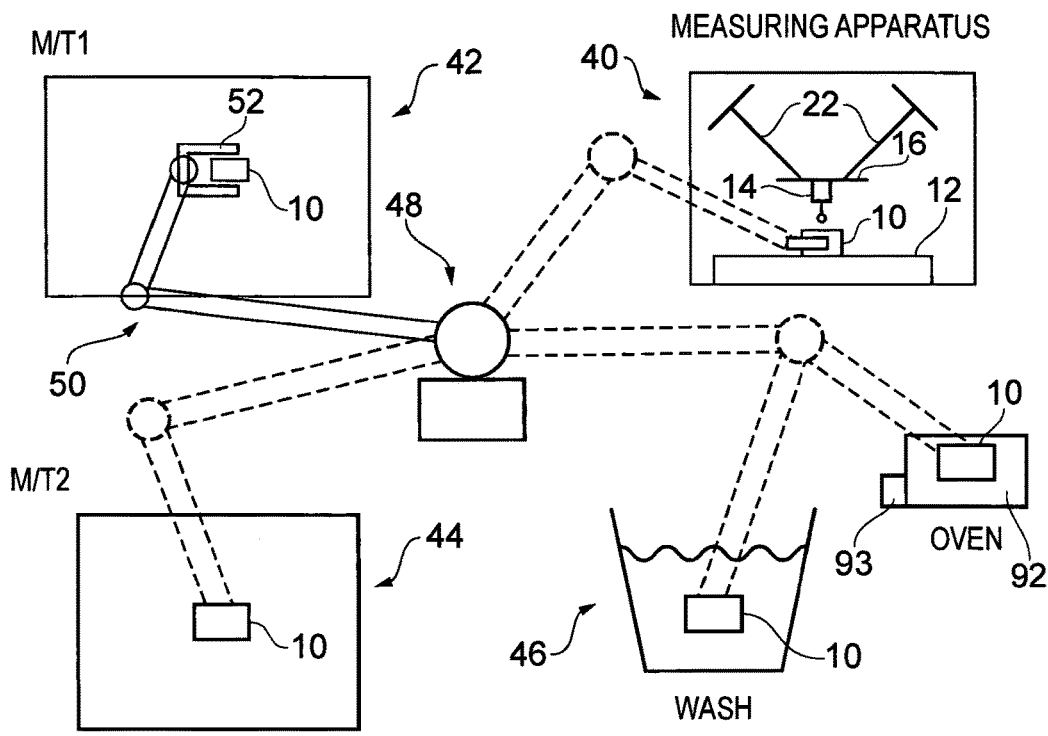
FIG. 3
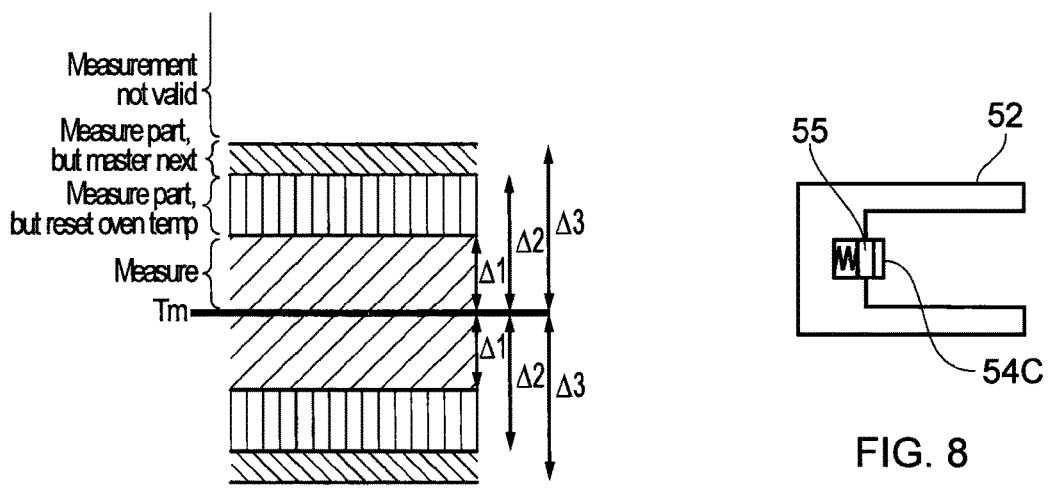
FIG. 7
FIG. 8

METHOD AND APPARATUS FOR INSPECTING WORKPIECES

FIELD OF THE INVENTION

This invention relates to measuring apparatus for inspecting the dimensions of workpieces, and more particularly to coordinate measuring apparatus. Coordinate measuring apparatus include, for example, coordinate measuring machines (CMM), machine tools, manual coordinate measuring arms and inspection robots.

DESCRIPTION OF PRIOR ART

It is common practice after workpieces have been produced, to inspect them on a coordinate measuring machine (CMM) having a movable member supporting a probe, which can be driven within a three-dimensional working volume of the machine.

The CMM (or other coordinate measuring apparatus) may be a so-called Cartesian machine, in which the movable member supporting the probe is mounted via three serially-connected carriages which are respectively movable in three orthogonal directions X, Y, Z. Alternatively, it may be a non-Cartesian machine, for example comprising three or six extensible struts which are each connected in parallel between the movable member and a relatively fixed base member or frame. The movement of the movable member (and thus the probe) in the X, Y, Z working volume is then controlled by coordinating the respective extensions of the three or six struts. An example of a non-Cartesian machine is shown in International Patent Applications WO 03/006837 and WO 2004/063579.

Thermal expansion and contraction affects the measurement of workpieces. To measure a workpiece more accurately, it is known from U.S. Pat. No. 5,257,460 (McMurtry) and U.S. Pat. No. 5,426,861 (Shelton) to take measurements of a reference workpiece or master artefact, having features of a similar size and shape to the workpiece. These are then compared with the measurements of the production workpiece under inspection. For example, if the master artefact/reference workpiece is a known, good workpiece in a series of nominally identical workpieces, then it may act as a datum against which all the other workpieces are compared. If absolute measurement is required, then the master artefact/reference workpiece may be calibrated on a more accurate measuring machine.

In U.S. Pat. No. 5,426,861 (Shelton), after the reference workpiece has been calibrated, it is allowed to acclimatise to the environmental temperature in which the production workpieces are to be measured. The measurements of the reference and production workpieces can be validly compared if they are at the same temperature. However, a problem arises if the production workpiece is at a different temperature from the environmental temperature of the CMM or other measuring apparatus on which it is being measured. This commonly happens if the production workpiece has just been transferred from a production machine such as a machine tool or welding apparatus, in which it becomes heated above the environmental temperature. In some cases, the production workpiece may be at a lower temperature than the environmental temperature, e.g. if it has been subjected to a cryogenic machining process using a coolant such as liquid nitrogen or liquid carbon dioxide.

U.S. Pat. No. 5,257,460 (McMurtry) partly overcomes this problem by keeping the reference workpiece in the thermal environment of the machine tool which produces the production workpieces. The measurements take place on the machine tool itself. However, the machining process produces heat in the production workpiece, which may therefore still have a different temperature from the reference workpiece, even though it is in the same thermal environment. Furthermore, it may be desired to perform the measurements off the machine tool on a separate measurement apparatus, so as to minimise the time during which the machine tool is not machining workpieces.

SUMMARY OF THE INVENTION

The present invention provides a method of measuring a series of substantially and/or nominally identical workpieces, in which each workpiece of the series is received from a manufacturing process and placed on a measuring apparatus, comprising:
  (a) measuring one of said workpieces, or an artefact having a plurality of features the size and shape of which approximate said workpieces, on said measuring apparatus at a non-ambient temperature as a reference workpiece, to produce measured dimensional values of the reference workpiece;
  (b) obtaining calibrated values of said dimensional values from a source external to said measuring apparatus; and
  (c) generating an error map or look-up table or error function which relates measured dimensional values of the reference workpiece at a non-ambient temperature to the corresponding calibrated values.

The dimensional values could be sizes of workpiece features, such as lengths, widths, diameters, radiuses etc. Or they could be the coordinate locations of points on the surface of the workpiece. Or they could be contour or form data, e.g. describing a free-form surface of the workpiece. Or they could be other measurements such as the circularity of a boss or bore, or the flatness of a surface, or the squareness of two or more surfaces. They could be any dimensional value that can be specified in a design drawing of the workpiece, e.g. according to international standards such as ISO 1660, ISO 14660, ISO 128, ISO 406 or ASME Y14.5.

In one preferred embodiment, step (a) is performed before step (b). The calibrated values could be obtained by calibrating the reference workpiece at a reference temperature.

Further workpieces of the series may be measured on the measuring apparatus at a temperature which is within a predetermined tolerance of said non-ambient temperature, to produce measured dimensional values corresponding to those of the reference workpiece, and the measured dimensional values of the further workpieces may be corrected using the error map or look-up table or error function.

Thus, in advantageous embodiments of the invention, the reference workpiece may be measured at a non-ambient temperature caused as a result of a machining process or other manufacturing process by which it was produced or processed. The further production workpieces of the series undergo a similar process or processes, so when they are measured they have similar non-ambient temperatures to the reference workpiece. This improves the validity of the comparison between the reference and production workpieces, and thus the accuracy of the correction.

Each workpiece of the series may be received from the manufacturing process and placed on the measuring apparatus in a repeatable manner which provides that the temperature of each workpiece is within said pre-determined tolerance. For example, this will tend to be true on an automated production line, where the transfer time of the workpieces from a production machine to a measuring machine may tend to be sufficiently repeatable. E.g. the workpieces may be transferred between machines by a robot, though manual transfer is also possible.

If the measured temperature of a further workpiece differs from said non-ambient temperature by more than the predetermined tolerance, then it is possible to re-measure the reference workpiece at a new temperature, to produce new measured dimensional values thereof, and generate a new error map or look-up table or error function which relates the new measured dimensional values at the new temperature to the corresponding calibrated values.

Alternatively, the reference workpiece may be re-measured at a second temperature different from said non-ambient temperature, and an error map or look-up table or error function may be generated which relates dimensional values of the reference workpiece at a third temperature to the corresponding calibrated values by interpolation between or extrapolation from said non-ambient and said second temperatures.

Alternatively, the temperature of a further workpiece of the series may be measured, and if it differs from said non-ambient temperature by more than a predetermined tolerance it is possible to
- measure said further workpiece on said measuring apparatus at a non-ambient temperature as a new reference workpiece, to produce measured dimensional values of the new reference workpiece;
- obtain calibrated values of said dimensional values from a source external to said measuring apparatus; and
- generate a new error map or look-up table or error function which relates said measured dimensional values of the new reference workpiece to the corresponding calibrated values.

The reference workpiece may be stored in a temperature maintenance device, e.g. a heating device such as an oven, or a cooling device such as a refrigerator or freezer. The temperature maintenance device may be adjusted to adjust the temperature of the reference workpiece to the measured temperature of the further workpiece, to within a predetermined tolerance.

The calibrated values in step (b) may be obtained by measuring the reference workpiece externally of said measuring apparatus, e.g. on a separate CMM or other measuring apparatus. The external measuring apparatus may be capable of measurements which are traceable to international standards, but this is not essential.

Alternatively, the calibrated values may be obtained from nominal design values of the dimensions or coordinate points of the reference workpiece, e.g. from a drawing or from a model in a computer aided design (CAD) system. This relies on an assumption that the reference workpiece was manufactured sufficiently accurately in accordance with the drawing or CAD model.

Further aspects of the present invention provide measuring apparatus configured to perform any of the above methods, and software which is configured to cause a measuring apparatus to perform such a method. The measuring apparatus may be a coordinate measuring apparatus, such as a coordinate measuring machine.

BRIEF DESCRIPTION OF THE DRAWINGS

Preferred embodiments of the invention will now be described, by way of example, with reference to the accompanying drawings, wherein:

FIG. 3 shows diagrammatically several factory machines forming part of an automated production system;

FIG. 7 shows temperature thresholds used in the method of FIG. 6; and

FIG. 8 shows a gripper for a robot used in the automated production system of FIG. 3.

DESCRIPTION OF PREFERRED EMBODIMENTS

Figure 1:
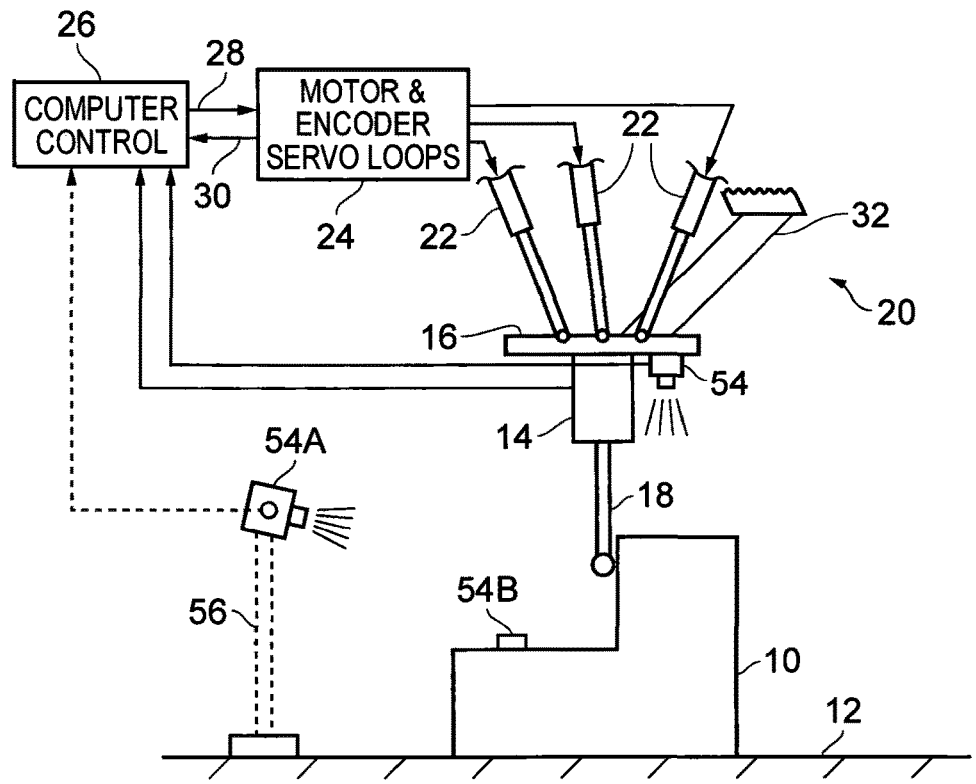
FIG. 1 is a diagrammatic representation of a non-Cartesian measuring apparatus or coordinate measuring machine (CMM)

In the measuring apparatus or coordinate measuring machine shown in FIG. 1, a workpiece 10 which is to be measured is placed on a table 12 (which forms part of the fixed structure of the machine). A probe having a body 14 is mounted to a movable platform member 16. The probe has a displaceable elongate stylus 18, which in use is brought into contact with the workpiece 10 in order to make dimensional measurements.

The movable platform member 16 is mounted to the fixed structure of the machine by a supporting mechanism 20, only part of which is shown. In the present example, the supporting mechanism 20 is as described in International Patent Applications WO 03/006837 and WO 2004/063579. It comprises three telescopic extensible struts 22, each extending between the platform 16 and the fixed structure of the machine, thereby forming a so-called parallel-acting or non-Cartesian machine. Each end of each strut 22 is universally pivotably connected to the platform 16 or to the fixed structure respectively, and is extended and retracted by a respective motor. The amount of the extension is measured by a respective encoder. The motor and encoder for each strut 22 form part of a servo loop controlling the extension and retraction of the strut. In FIG. 1, the three motors and encoders in their three respective servo loops are indicated generally by reference numeral 24.

The supporting mechanism 20 also comprises three passive anti-rotation devices 32 (only one of which is shown in FIG. 1). The anti-rotation devices extend in parallel between the platform 16 and the fixed structure of the machine. Each anti-rotation device constrains the platform 16 against one rotational degree of freedom. As a result, the platform 16 is movable with only three translational degrees of freedom, but cannot tilt or rotate. See U.S. Pat. No. 6,336,375 for further discussion of such anti-rotation devices. International Patent Applications WO 03/006837 and WO 2004/063579 and U.S. Pat. No. 6,336,375 are incorporated herein by reference.

Figure 2:
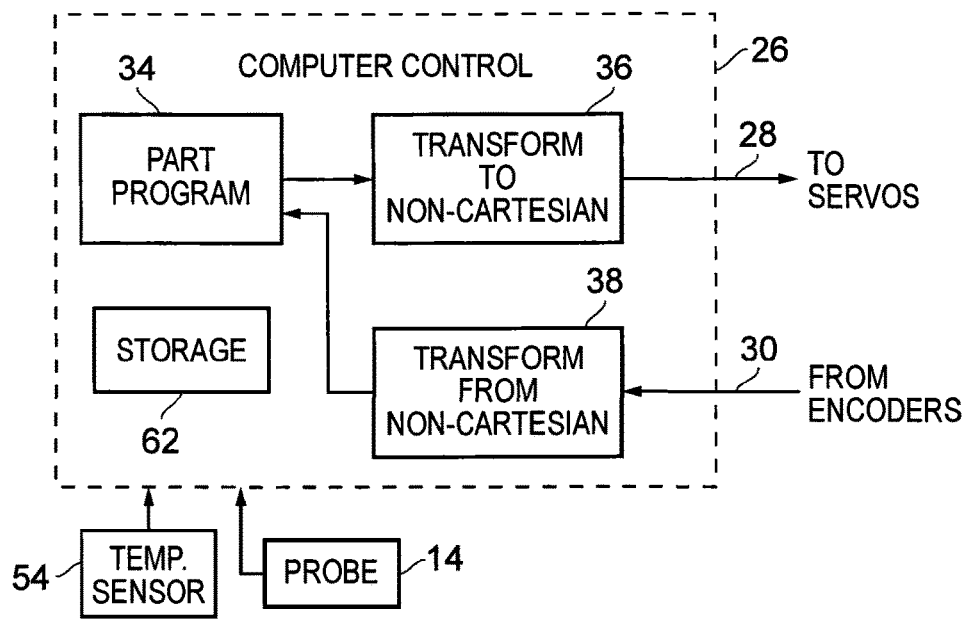
FIG. 2 shows diagrammatically a part of a computer control system of the machine.

Referring to FIG. 1 with FIG. 2, a computer control 26 positions the movable platform 16, under the control of a part program 34 which has been written for the measurement of the workpiece 10. To achieve this, the control 26 coordinates the respective extensions of the three struts 22. A program routine 36 transforms commands in X, Y, Z Cartesian coordinates from the part program to corresponding non-Cartesian lengths required of the struts. It produces demand signals 28 to each of the servo loops 24, as a result of which the three struts 22 extend or retract to position the platform 16 accordingly. Each servo loop acts in a known manner to drive the respective motor so as to cause the encoder output to follow the demand signal 28, tending to equalise them.

The control 26 also receives measurement signals 30 from the encoders which form part of the servo loops. These indicate the instantaneous non-Cartesian lengths of each of the struts 22. They are transformed back into Cartesian X, Y, Z coordinates by a program routine 38, for use by the part program 34.

The probe 14 may be a touch trigger probe, which issues a trigger signal to the computer control 26 when the stylus 18 contacts the workpiece 10. Alternatively, it may be a so-called measuring or analogue probe, providing analogue or digital outputs to the control 26, which measure the displacement of the stylus 18 relative to the body 14 of the probe in three orthogonal directions X, Y, Z. Instead of such contact probes, it may be a non-contact probe such as an optical probe.

In use, the platform 16 is moved to position the probe 14 relative to the workpiece 10, under the control of the part program, either in a point-to-point measurement pattern, or scanning across or along the surface of the workpiece. For touch trigger measurements, when it receives the touch trigger signal the computer control 26 takes instantaneous readings of the non-Cartesian measurement signals 30 from the encoders of the struts 22, and the transform routine 38 processes these to determine an X, Y, Z Cartesian coordinate position of the point contacted on the workpiece surface. In the case of a measuring or analogue probe, the control combines the instantaneous outputs of the probe with the instantaneous values transformed into Cartesian coordinates from the measurement signals 30 of the struts. In the case of scanning, this is done at a large number of points to determine the form of the workpiece surface. If required, feedback from a measuring or analogue probe may be used to alter the demand signals 28, so that the machine moves the probe in order to keep it within a desired measuring range of the workpiece surface.

The embodiment of the invention shown in FIG. 1 includes an infra-red temperature sensor 54, which may conveniently be mounted on the movable platform member 16 in order to address the workpiece 10 being measured and measure its temperature. Alternatively, an infra-red sensor 54A may be mounted to the fixed structure of the CMM, e.g. on an optional bracket or stand 56, in order to measure the workpiece temperature. Such an infra-red sensor may simply take an average reading of the temperature of an area of the workpiece surface, or it may be a thermal imaging sensor arranged to recognise and take the temperature of a specific workpiece feature.

In another alternative, if the CMM has facilities for automatically exchanging the probe 14, then it may be exchanged for a contact temperature sensor (not shown) which is brought into contact with the surface of the workpiece 10 and dwells there for a period in order to measure its temperature. Such an exchangeable contact temperature sensor is described in U.S. Pat. No. 5,011,297, incorporated herein by reference. Or a temperature sensor (such as a thermocouple) may be placed manually on the surface of the workpiece, as shown at 54B.

In use, the measuring apparatus described in FIGS. 1 and 2 may be used to inspect a series of production workpieces 10 which are nominally or substantially identical, as they come off a production line, or as they are manufactured on a machine tool. FIG. 3 shows an example production system, in which the measuring apparatus or CMM of FIGS. 1 and 2 is shown diagrammatically at 40. Also shown diagrammatically by way of example are machine tools 42, 44, and a wash station 46. A robot 48 with an articulating arm 50 and a gripper 52 is provided to transfer workpieces 10 produced on the machine tools 42, 44 to the measuring apparatus 40, optionally via the wash station 46 in order to remove swarf and coolant. The robot operates under its own computer control, coordinated with computer controls of the other machines. Alternatively, manual transfer of workpieces 10 to the measuring machine from the machine tools or washing station is possible. It will be appreciated that the machines shown in this production system are merely examples. As another example, the measuring apparatus 40 may be part of an automated transfer line in a foundry, to which castings are transferred manually or by a robot in order to be measured. Or it may receive articles produced in a pressing or stamping plant.

As an alternative to the temperature sensors 54, 54A or 54B described above, a temperature sensor 54C may be located in the robot gripper 52 as shown in FIG. 8, in order to measure the temperature of a workpiece 10 as it is transferred to the measuring apparatus 40. The sensor 54C may be mounted on a spring plunger 55 to maintain contact with the workpiece. This has the advantage that if it is found that the temperature of the workpiece falls outside one of the tolerance bands described below, and therefore the workpiece is not to be measured, then it need not even be placed on the measuring apparatus. This saves time.

Figure 4:
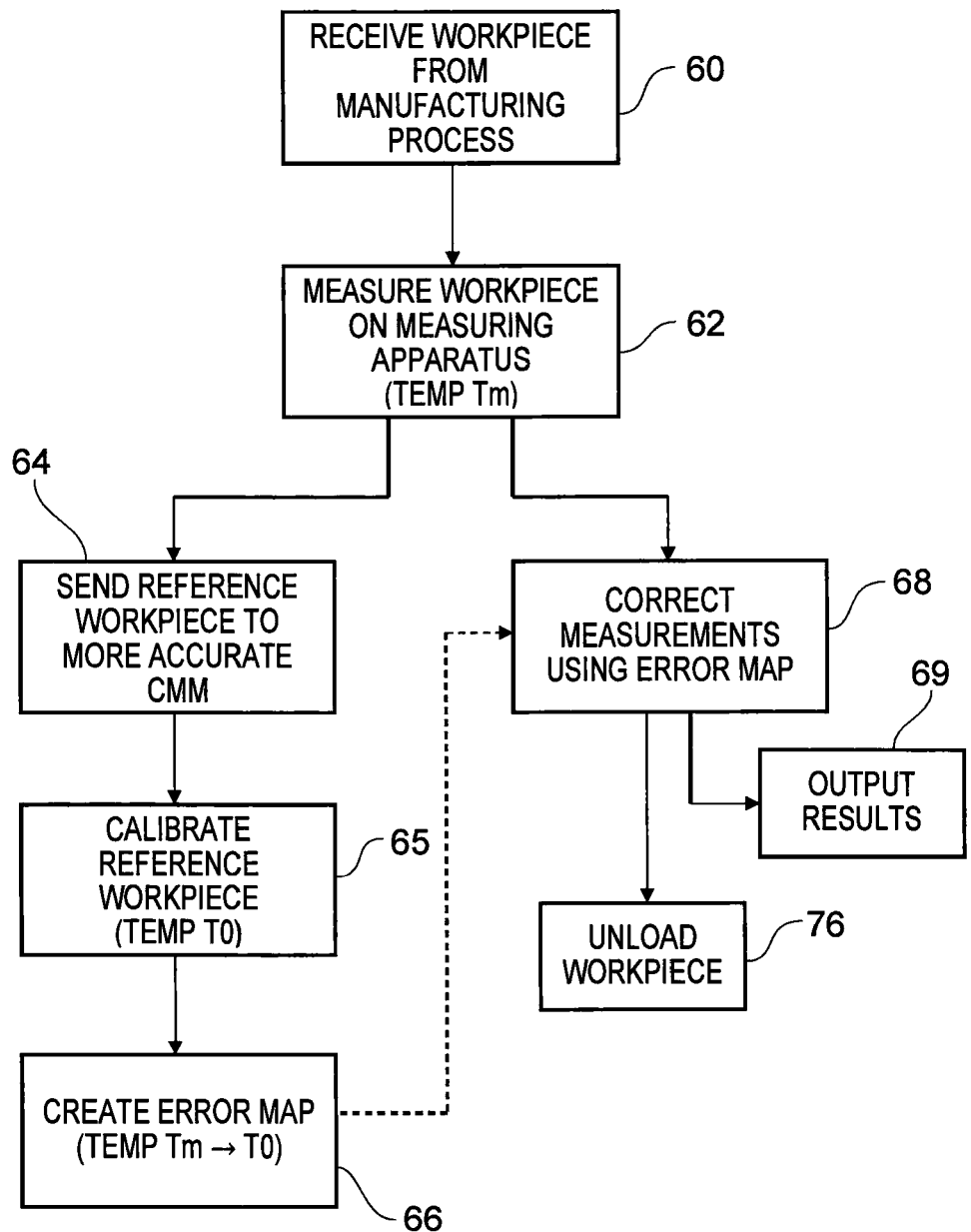
FIGS. 4-6 are flowcharts showing preferred methods according to the invention.
Figure 5:
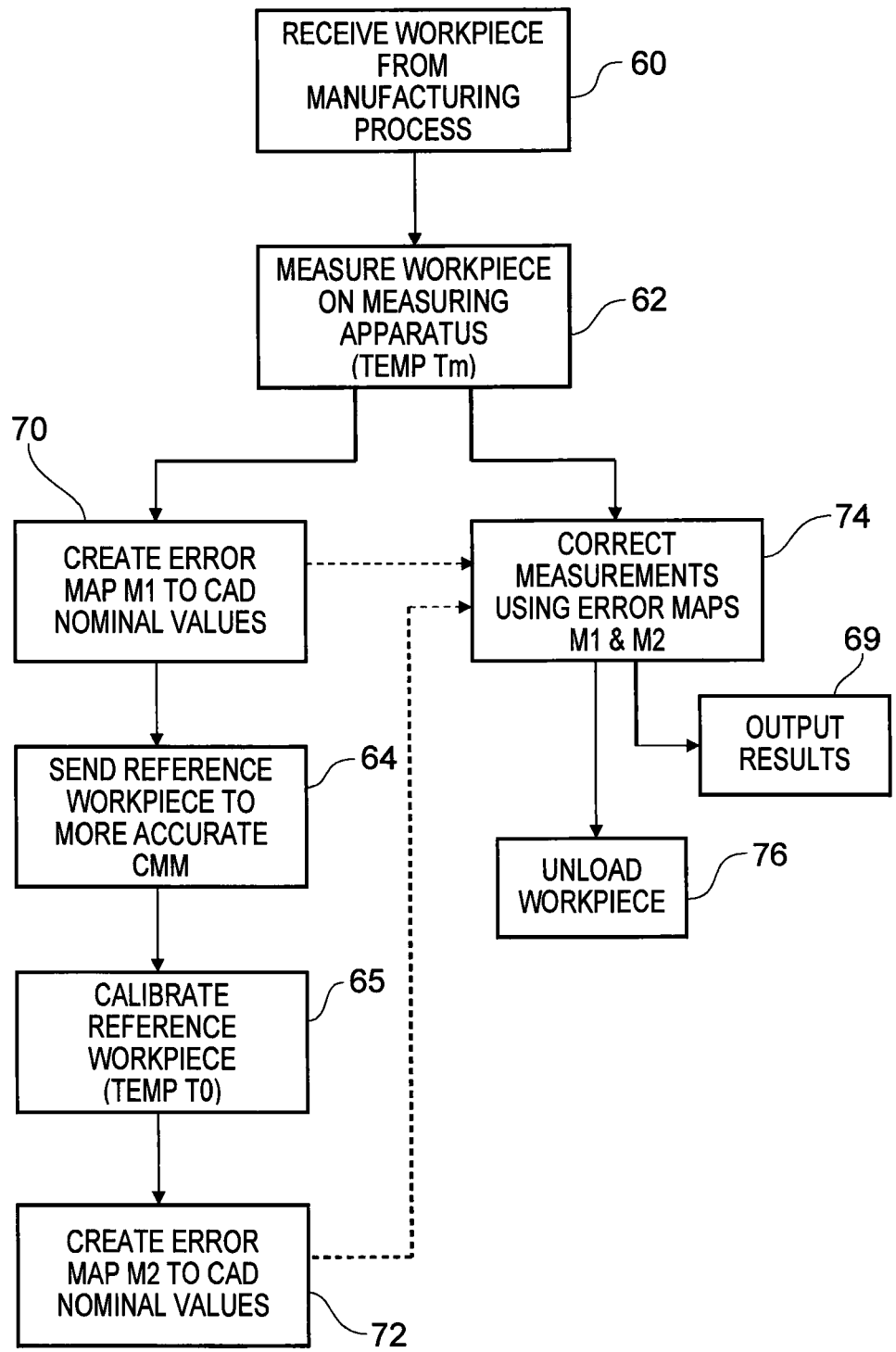
Figure 6:
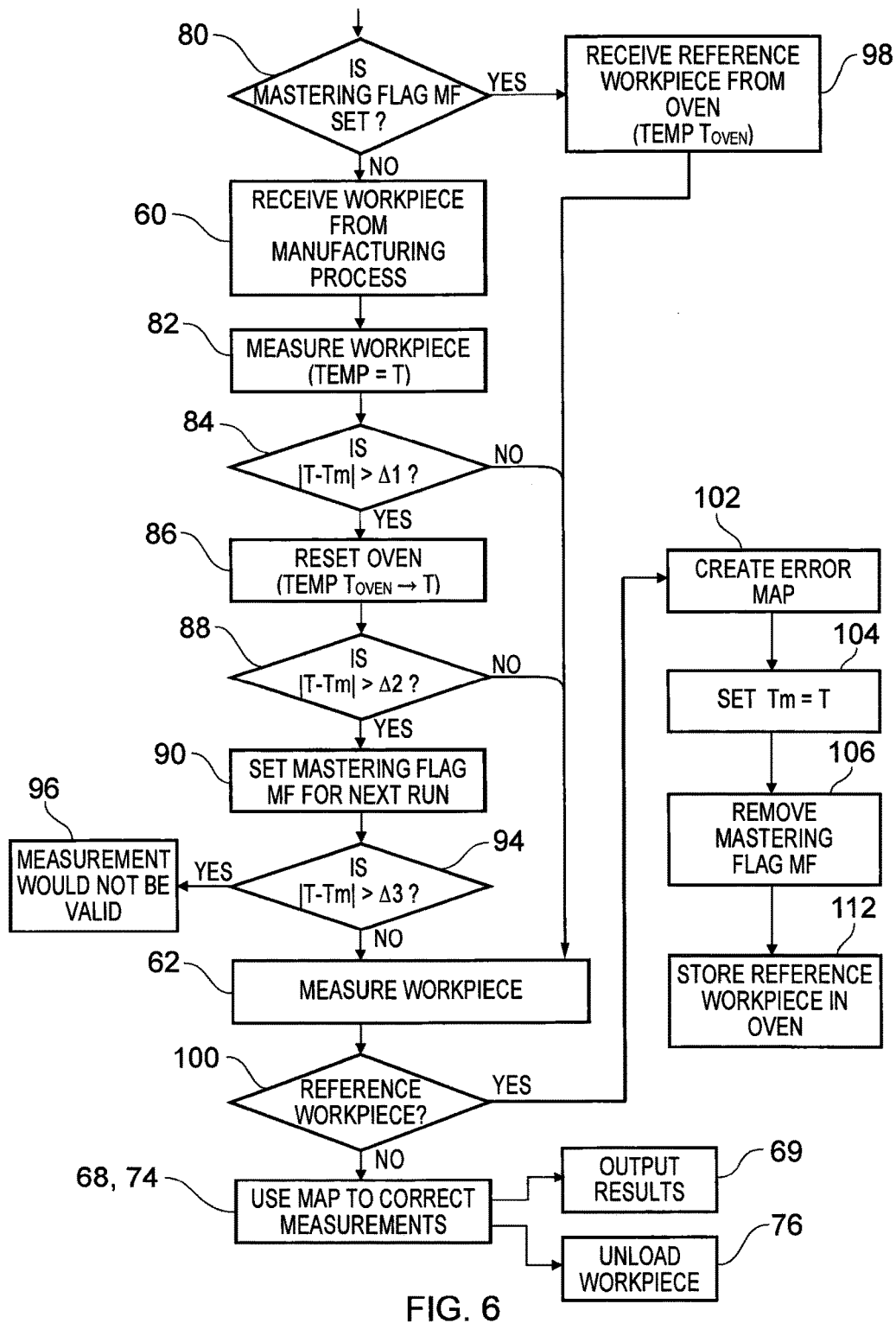

The computer control 26 of the CMM 40 may operate programs which perform processes as shown in FIGS. 4 to 6. Some steps of these processes may be performed manually, or include manual intervention. For example, where it is required to place an article on the table 12 of the CMM, this may be done manually or by the robot 48.

At the start of the process shown in FIG. 4, (step 60), the robot 48 takes one of the series of production workpieces 10 produced on one of the machine tools 42, 44 and places it on the table 12 of the CMM 40. This workpiece 10 may be the first of the series to be produced, and acts as a master artefact or reference workpiece. Since it is one of the workpieces in the series of nominally or substantially identical production workpieces, it thereby has features with similar dimensions to subsequent workpieces to be measured. Thus, for example, the features may have similar shapes, and/or their sizes and/or locations may correspond. And/or the dimensional relationships between features may correspond. For example the master artefact/reference workpiece may have features such as bores which are spaced apart by a similar distance as corresponding features of the production workpiece. Or it may have parallel surfaces which correspond to parallel surfaces of the production workpiece. It is not necessary that the master artefact or reference workpiece is manufactured perfectly; its dimensions may depart from the nominal design values.

The reference workpiece 10 has just undergone heat-producing manufacturing processes, such as machining on the machine tool 42, 44. As a result, when it is placed on the table 12 of the CMM 40 it will be at some temperature Tm, which will not be the ambient or environmental temperature of the machine itself. However, in an automated production system, all subsequent workpieces 10 will have undergone the same heat-producing manufacturing processes as the reference workpiece. Furthermore, the time taken for the robot 48 to transfer each workpiece from the machine tool to the measuring apparatus 40 will be substantially the same. Therefore, if there is no drift in the working conditions, when subsequent workpieces are placed on the table 12 they too will tend to have the same temperature Tm as the reference workpiece. The temperature Tm at which the workpieces 10 are received on the measuring apparatus 40 is substantially repeatable.

Even if the reference workpiece 10 is transferred to the measuring apparatus 40 via the wash station 46, the temperature Tm at which it is received on the measuring apparatus 40 will be substantially repeatable, if the duration of the washing step and the temperature of the washing fluid are substantially repeatable.

Likewise, the machine tool 42 or 44 may be one which performs cryogenic machining, e.g. using a coolant such as liquid nitrogen or liquid carbon dioxide, such that the temperature Tm of the reference workpiece 10 when received on the CMM 40 is below ambient temperature, rather than above. But if the cryogenic machining process is repeatable, the temperature Tm will still be repeatable.

The reference workpiece 10 described above is one of the series of nominally or substantially identical production workpieces. However, it is also possible to use a specially-produced artefact as the reference workpiece. This should have a plurality of features the size and shape of which approximate or match or correspond to the production workpieces of the series. Of course, the features which approximate or match are chosen to correspond to critical features which are to be measured when production workpieces are inspected. Preferably the artefact is made of the same material as the production workpieces, so that it has the same coefficient of thermal expansion. Alternatively, it may be made of a material which has a similar coefficient of thermal expansion to the production workpieces. The artefact should be heated or cooled to the temperature Tm at which production workpieces are received by the measuring apparatus 40 from the production line.

In step 62 of FIG. 4, the CMM 40 measures the reference workpiece 10, producing a set of measurement data at the temperature Tm. This measurement data may for example be coordinates of predetermined points on the surface of the workpiece, or it may be dimensions of workpiece features derived from such measured coordinate points. The measurement data is stored in the computer control 26 of the CMM 40, or in a separate computer.

In step 64, the reference workpiece 10 is removed from the CMM 40, e.g. by the robot 48, and sent for calibration on a separate measuring apparatus (not shown). This may be a more accurate CMM located in a measurement laboratory under controlled thermal conditions. The reference workpiece 10 is allowed to cool (or warm) to a standard calibration temperature T0. In a step 65, it is calibrated by measuring it on the separate CMM or other measuring apparatus, producing a further set of measurement data. As with the measurement in step 62, this measurement data may for example be coordinates of predetermined points on the surface of the workpiece, or it may be dimensions of workpiece features derived from such measured coordinate points.

In step 66, the sets of data from steps 62 and 65 are compared, and an error map is generated. This error map relates the differences of the measurements between the measurement temperature Tm and the calibration temperature T0. It may be generated either by the computer control 26 of the CMM 40, or by a separate computer, e.g. the computer controlling the calibration machine in the measurement laboratory. In either case, the error map may now be stored in the computer control 26 of the CMM 40 for use as described below.

The measurement of subsequent workpieces 10 in the series now proceeds as follows.

Each workpiece 10 is received from the manufacturing process (step 60), substantially at the repeatable temperature Tm. It is measured on the measuring apparatus 40 (step 62) at that repeatable temperature producing a set of measurement data which may be of coordinate points or measured dimensions, as above. In step 68, the measurement data are corrected using the error map received from the step 66.

The resulting corrected measurements are stored in the computer control 26, or transferred out of the computer control 26 for further use, as desired (step 69). The workpiece is unloaded from the measuring apparatus 40 (step 76).

These corrected measurements have improved accuracy because they are corrected for the actual temperature Tm at which the workpieces 10 are measured as they are received from the manufacturing process. They are not merely corrected for the ambient temperature of the measuring apparatus 40.

FIG. 5 shows a modified process. The first reference workpiece 10 of the series is received from the manufacturing process in a repeatable manner, and measured on the measuring apparatus 40, as in FIG. 4 (steps 60 and 62). Then, in a step 70, the computer control 26 of the CMM 40 creates a first error map M1 from the resulting set of measurement data. It does this by comparing the measured coordinate points or measured dimensions of the reference workpiece 10 to the nominal design values of such coordinate points or dimensions, e.g. as shown in a design drawing of the workpiece 10. The preferred source of such design values is a computer aided design (CAD) file of the workpiece 10.

Next, as in step 64 of FIG. 4, the first-off reference workpiece 10 is sent to the more accurate CMM in the measurement laboratory and calibrated. However, unlike FIG. 4, an error map is not generated between the measurements at temperatures Tm and T0. Instead, in step 72 of FIG. 5 a second error map M2 is generated between the calibration measurement data at temperature T0 and the nominal design values (e.g. CAD values) used in step 70. This may be performed by the computer controlling the CMM in the measurement laboratory. This error map M2 is sent to the computer control 26 of the measuring apparatus 40.

Measurements of subsequent workpieces in the series proceeds as follows.

Each subsequent workpiece 10 is received and measured in step 60 and 62, as previously, to produce a set of measurement data at temperature Tm. Then, in step 74, the computer control 26 corrects this set of measurement data using both the error maps M1 and M2. For each point it may add the corresponding error value from the map M1, and then the corresponding error value from the map M2. Alternatively, to save time, the corresponding error values from M1 and M2 could have been added together in advance. The results are stored in the computer control 26, or transferred for use as required (step 69).

This has the advantage that the corrected measurements are corrected with respect to the nominal design values (CAD values). They can be fed back into the manufacturing process, e.g. to adjust the machine tool 42 or 44 to correct the manufacture of subsequent workpieces 10.

In a simpler version of the FIG. 5 process, it is possible for step 74 to correct measurements using only the error map M1 (which relates the measurement data of the reference workpiece to the nominal design values). The error map M2 and the steps 64, 65, 72 which create it may be omitted. While less accurate, this has the advantage that it is not necessary to send the reference workpiece for measurement on a separate, more accurate CMM.

As so far described, it is not even necessary to measure the temperature Tm at which the workpieces 10 are measured. Useful results can be obtained merely by assuming that the manufacturing process, and the process by which the workpieces 10 are transferred to the measuring apparatus 40, are repeatable, so that the temperature Tm is itself substantially repeatable.

However, this assumption may not always be true, for example if there is a drift in the environmental working temperatures of the machine tools and measuring apparatus during the course of a working day.

FIG. 3 therefore shows an optional temperature-controlled oven 92, which acts as a temperature maintenance device to maintain the reference workpiece at the desired reference temperature, initially the temperature Tm. The robot 48 can transfer the reference workpiece 10 to the oven 92 and back again, as required. In the case of cryogenic machining, where the reference temperature Tm may be below the ambient temperature, the oven 92 may be replaced by another suitable temperature maintenance device such as a refrigerator or freezer. The temperature of the temperature maintenance device is controlled by the computer control which runs the measuring program. Alternatively, the temperature of the temperature maintenance device may be controlled by a separate computer or a programmable logic controller (PLC).

In any of these cases, the computer control or the separate computer or PLC receives an input from one of the various alternative temperature sensors discussed above, e.g. sensor 54, 54A, 54B or 54C.

FIG. 6 shows a further development of the methods shown in FIGS. 4 and 5, making use of the reference workpiece kept in the oven 92 or other temperature maintenance device. The following discussion will merely refer to an oven, but it should be understood that other temperature maintenance devices may be substituted as appropriate.

Initial error maps are created in a similar manner to FIG. 4 (steps 60, 62, 64, 66) or FIG. 5 (steps 60, 62, 70, 64, 72). These make use of a reference workpiece whose temperature Tm is measured using one of the temperature sensors such as 54, 54A, 54B or 54C. The reference workpiece is then placed in the oven 92 by the robot 48 or manually, and a temperature regulator 93 of the oven is initially set to keep the oven temperature $T_{oven}$ at the temperature Tm, in order for the reference workpiece to track the same temperatures as the production workpieces as they change over time. The adjustment of the temperature of the oven is suitably performed by the computer control. Alternatively it may be performed in a separate loop from FIG. 6 by the separate computer or PLC mentioned above.

FIG. 6 shows the modified procedure when subsequent workpieces of the series are then placed on the measuring apparatus 40 in order to be measured.

The procedure in FIG. 6 proceeds differently, depending whether the workpiece to be measured is the reference workpiece (master workpiece) or a normal production workpiece. A mastering flag MF is set or unset to indicate which is required. In a preliminary step 80, a check is made to verify whether this mastering flag MF is set. If it is not, then a production workpiece is received from the manufacturing process as in FIG. 4 or FIG. 5, step 60. In step 82, its temperature T is measured, suitably using one of the temperature sensors discussed above, such as 54, 54A, 54B or 54C.

Step 84 then determines whether the measured temperature T of the production workpiece lies above or below a tolerance threshold ±Δ1 of the temperature Tm for which the error map was determined in FIG. 4 or FIG. 5. In other words, is the absolute value of T−Tm greater than Δ1? This temperature tolerance band between the threshold values ±Δ1 is shown in FIG. 7.

The values ±Δ1 are chosen such that within this tolerance band, corrections based on the error map taken at temperature Tm yield acceptable measurement results, and there is no need to adjust the temperature of the oven in which the reference workpiece is kept. In this case, the procedure proceeds as in FIG. 4 or FIG. 5. The production workpiece is measured in the normal way (step 62). The measurements are corrected using the error map or maps (step 68, FIG. 4 or step 74, FIG. 5). The results are output (step 69) and the workpiece is unloaded from the measuring apparatus 40 (step 76).

If step 84 determines that the temperature T of the workpiece lies outside the tolerance band, above or below the tolerance thresholds ±Δ1, then the computer control (or the separate computer or PLC of the oven) resets the temperature regulator 93 of the oven 92 to the new temperature T (step 86). This tends to keep the reference workpiece at a temperature which tracks the temperature T at which new workpieces of the series are coming off the production process, though there will inevitably be some small time lag. Thus, the values ±Δ1 are chosen as values where such resetting of the oven temperature is desirable.

Alternatively, it is possible to monitor the trend of the temperature change, and to adjust the oven temperature to a higher or lower value than T, which anticipates such changes. This may reduce or eliminate the time lag mentioned above.

After resetting the oven temperature in step 86, step 88 then determines whether the measured temperature T of the production workpiece lies above or below a tolerance threshold ±Δ2 of the temperature Tm for which the error map was determined in FIG. 4 or FIG. 5. Is the absolute value of T−Tm greater than Δ2? This temperature tolerance band between the threshold values ±Δ2 is larger than the previous band between the values ±Δ1, and is also shown in FIG. 7.

Within this larger tolerance band ±Δ2, corrections based on the error map taken at temperature Tm still yield acceptable measurement results. If step 88 determines that the threshold values ±Δ2 are not exceeded, therefore, the procedure proceeds as in FIG. 4 or FIG. 5 (steps 62; 68 or 74; 69 and 76).

However, if the threshold values ±Δ2 are exceeded in step 88, then the mastering flag NIF is set (step 90). This indicates that the next run should be a "re-mastering", that is the reference or master workpiece should be re-measured and a new error map generated. The values ±Δ2 are therefore chosen at values which indicate that, while corrections based on the current error map are still acceptable, the limits of acceptability are being approached.

Next, a step 94 determines whether the measured temperature T of the production workpiece lies above or below a tolerance threshold ±Δ3 of the temperature Tm. Again, the corresponding tolerance band is indicated in FIG. 7. The values ±Δ3 are chosen such that if this temperature band is exceeded, then the corrections based on the current error map would not yield valid measurement results, within predetermined acceptable tolerance limits. In this case, the workpiece is unloaded from the measuring apparatus 40 (step 96) and it is not measured. In the case where the temperature of the workpiece is measured by a sensor 54C in the robot gripper 52, the workpiece need not even be loaded onto the measuring apparatus 40, but simply discarded or placed to one side. This saves time.

Assuming, however, that in step 94 the tolerance band ±Δ3 is not exceeded, the measurement of the workpiece and the correction of the measurement results proceeds in the normal way (steps 62; 68 or 74; 69 and 76).

The procedure then runs again. If the mastering flag NIF is not set in the preliminary step 80, then another workpiece is received from the manufacturing process (step 60); it is measured and the measurements corrected as described above.

However, if the mastering flag NIF is set in step 80, then re-mastering takes place as follows. In step 98, the robot 48 is commanded to remove the master/reference workpiece from the oven 92 (where its temperature has been tracking the temperature T of workpieces received from the manufacturing process). It is placed on the measuring apparatus 40 and measured (step 62). It is also possible to remove the reference workpiece from the oven and place it on the apparatus manually. Then, checking the mastering flag MF, a step 100 diverts the process flow to a step 102. Here, a new error map M1 is created, as in step 70 of FIG. 5. Alternatively, provided the original calibration data has been stored, the error map generated in FIG. 4 step 66 may be regenerated and replaced with this new error map.

Next, in step 104, the value of Tm used in the various steps of the procedure described above is changed to the new value T of the reference workpiece at which this re-mastering has taken place. And in step 106, the mastering flag MF is removed, ready for the next run starting at step 80.

The robot 48 now replaces the reference workpiece in the oven 92 (step 112). Or it is replaced manually. The system is ready to carry on measuring and correcting further production workpieces received in the series from the production process.

Rather than the above re-mastering process with the existing reference workpiece, it is possible to create a new reference workpiece from the further workpiece of the series which is currently being measured. E.g. this may be done when it is found that the tolerance band ±Δ2 or ±Δ3 has been exceeded. The current workpiece is measured in step 62, and then a new error map is created. This may be as in steps 64-66 (FIG. 4). Or as in steps 70, 64, 65, 72 (FIG. 5), creating new maps M1 and M2. Or simply creating a new map M1 as in step 70 (FIG. 5).

As an alternative to keeping the reference workpiece in a separate temperature maintenance device such as the oven 92, it is possible to keep it within the working volume of a production machine such as one of the machine tools 42, 44 seen in FIG. 3. It will then experience the same thermal environment as production workpieces, and so it will tend to track changes in the temperature Tm at which workpieces are received from the production machine. Effectively, the production machine itself acts as a temperature maintenance device.

As another alternative to keeping the reference workpiece in a separate temperature maintenance device, it is possible to control or adjust the temperature Tm of the workpieces coming off the production line, before transferring them to the measuring apparatus 40. The aim is to reduce or prevent any drift of this temperature. One way to achieve this is to control the time for which the workpieces are washed in the wash station 46. The temperature of a workpiece after washing may be monitored by one of the temperature sensors such as 54, 54A, 54B, 54C, and the wash time of subsequent workpieces may be adjusted so as to tend to keep the temperature Tm constant. Another way to control or adjust the temperature Tm of the workpieces coming off the production line is to place them in a temperature-controlled chamber for a period of time before transferring them to the measuring apparatus 40, so that they acclimatise to the temperature of the chamber.

The methods of FIGS. 5 and 6 may use a specially-produced artefact as the reference workpiece, as described above in relation to FIG. 4, instead of one of the production workpieces from the series. As previously, this should have a plurality of features the size and shape of which approximate or match or correspond to the production workpieces of the series; it should preferably have the same or similar coefficient of thermal expansion as the production workpieces; and it should be heated or cooled to an appropriate temperature Tm.

It is also noted above that the methods described give improved accuracy because they correct the measurements for the actual temperature Tm at which the workpieces 10 are measured as they are received from the manufacturing process. They are not merely corrected for the ambient temperature of the measuring apparatus 40. However, it is possible to monitor the ambient temperature of the measuring apparatus 40 in addition. Then, if the ambient temperature changes by more than a predetermined threshold, the re-mastering process can be undertaken, e.g. by setting the mastering flag MF and performing steps 98-112 (FIG. 6) to generate a new error map. This has the advantage that subsequent corrections take account of thermal expansion or contraction of components of the measuring apparatus 40. The ambient temperature may be monitored with an environmental temperature sensor placed on or near the measuring apparatus 40. Or it can be monitored by measuring a known length of an object feature placed on or near the measuring apparatus 40, a change in the length indicating a change in the temperature of the apparatus. The object with a known length may be a piece of a material having a low coefficient of thermal expansion, such as Invar, though other materials may be used, e.g. with a high coefficient of thermal expansion.

In any of the methods described above, the error map may take the form of a lookup table which gives either an error correction or a corrected value for each measurement value. Or rather than a map, an error function (e.g. a polynomial error function) may be generated in a known manner, which gives the correction or corrected value for any measured input value.

As an alternative to separate temperature sensors such as the sensors 54, 54A, 54B, 54C, it is possible to use the measuring apparatus 40 itself as a temperature sensor. This may be done by measuring a feature of the workpiece which has a known or calibrated length and which therefore provides a reference for temperature by its thermal expansion.

One example of this is as follows. In this example, one of the machine tools 42, 44 is a lathe and the other is a milling machine. A turning operation on the lathe produces a feature having a certain diameter. This is followed by milling operations on the milling machine which introduce heat, changing the diameter. The feature diameter may be known by measuring it before the workpiece is transferred to the milling machine. Or it may simply be assumed to be a stable known value if there is confidence in the ability of the turning operation on the lathe to assure this. Then the diameter is re-measured after the workpiece has been transferred to the measuring apparatus 40 from the milling machine. The temperature Tm of the workpiece is then deduced using knowledge of its coefficient of thermal expansion.

It has been discussed that the error maps, lookup tables or error functions created in the above methods relate to the temperature Tm at which the reference workpiece is received from the production process. However, it is possible to produce an error map, lookup table or error function which relates to some other temperature, useful when production workpieces are received at such another temperature.

One way to do this is to adjust the measured dimensional values used to create the error map or lookup table or error function, in accordance with the required temperature difference and the coefficient of thermal expansion of the material of the workpieces.

Another way is useful when the reference workpiece has been re-measured at a second temperature, e.g. during a re-mastering process. There now exists measurement data for the reference workpiece at two temperatures (and perhaps for more temperatures). These data can be interpolated or extrapolated to create an error map or lookup table or error function at a third temperature.

The invention claimed is:

1. A method of measuring a series of substantially or nominally identical workpieces, in which each workpiece of the series is received from a manufacturing process and placed on a measuring apparatus that has an ambient temperature, comprising:
   (a) measuring one of said workpieces, or an artefact having a plurality of features the size and shape of which approximate said workpieces, on said measuring apparatus as a reference workpiece, to produce measured dimensional values of the reference workpiece;
   (b) obtaining calibrated values of said dimensional values from a source external to said measuring apparatus; and
   (c) generating an error map or look-up table or error function which relates measured dimensional values of the reference workpiece to the corresponding calibrated values,
   wherein:
      the reference workpiece is measured at a non-ambient temperature that is different from the ambient temperature, and
      the generated error map or look-up table or error function relates to the measured dimensional values at the non-ambient temperature.

2. A method according to claim 1, wherein further workpieces of the series are measured on the measuring apparatus to produce measured dimensional values, and wherein each workpiece of the series is received from the manufacturing process and placed on the measuring apparatus in a repeatable manner which provides that the non-ambient temperature of each workpiece is repeatable.

3. A method according to claim 2, wherein the repeatable non-ambient temperature is repeatable to within a predetermined tolerance.

4. A method according to claim 2, wherein the measured dimensional values of the further workpieces are corrected using the error map or look-up table or error function.

5. A method according to claim 1, wherein further workpieces of the series are measured on the measuring apparatus at a temperature which is within a predetermined tolerance of said non-ambient temperature, to produce measured dimensional values corresponding to those of the reference workpiece, and the measured dimensional values of the further workpieces are corrected using the error map or look-up table or error function.

6. A method according to claim 5, wherein each workpiece of the series is received from the manufacturing process and placed on the measuring apparatus in a repeatable manner which provides that the temperature of each workpiece is within said pre-determined tolerance.

7. A method according to claim 2, including a step of controlling or adjusting the temperature of a workpiece received from the manufacturing process, to reduce or prevent any drift of its temperature.

8. A method according to claim 1, wherein the error map or look-up table or error function generated in (c) relates the measured dimensional values of the reference workpiece at said non-ambient temperature in (a) to the corresponding calibrated values.

9. A method according to claim 1, wherein (a) is performed before (b).

10. A method according to claim 1, wherein said calibrated values are obtained by calibrating the reference workpiece at a reference temperature.

11. A method according to claim 1, wherein the error map or look-up table or error function relates the measured dimensional values of the reference workpiece to the corresponding calibrated values at a different temperature from step (a), using a coefficient of thermal expansion.

12. A method according to claim 1, including measuring the temperature of a further workpiece of the series, and if it differs from said non-ambient temperature by more than a predetermined tolerance:
   re-measuring the reference workpiece at a new temperature, to produce new measured dimensional values thereof, and
   generating a new error map or look-up table or error function which relates the new measured dimensional values at the new temperature to the corresponding calibrated values.

13. A method of measuring a series of substantially or nominally identical workpieces, in which each workpiece of the series is received from a manufacturing process and placed on a measuring apparatus that has an ambient temperature, comprising:
   (a) measuring one of said workpieces, or an artefact having a plurality of features the size and shape of which approximate said workpieces, on said measuring apparatus as a reference workpiece, to produce measured dimensional values of the reference workpiece;
   (b) obtaining calibrated values of said dimensional values from a source external to said measuring apparatus; and
   (c) generating an error map or look-up table or error function which relates measured dimensional values of the reference workpiece to the corresponding calibrated values,
   wherein:
      the reference workpiece is measured at a non-ambient temperature that is different from the ambient temperature, and
      the generated error map or look-up table or error function relates to the measured dimensional values at the non-ambient temperature,
   the method further comprising:
      measuring the temperature of a further workpiece of the series, and if it differs from said non-ambient temperature by more than a predetermined tolerance:
      re-measuring the reference workpiece at a new temperature, to produce new measured dimensional values thereof, and generating a new error map or look-up table or error function which relates the new measured dimensional values at the new temperature to the corresponding calibrated values.

14. A method according to claim 1, wherein the reference workpiece is re-measured at a second temperature different from said non-ambient temperature, and an error map or look-up table or error function is generated which relates dimensional values of the reference workpiece at a third temperature to the corresponding calibrated values by interpolation between or extrapolation from said non-ambient and said second temperatures.

15. A method according to claim 1, including monitoring the ambient or environmental temperature of the measuring apparatus, and if it changes by more than a predetermined tolerance:
   re-measuring the reference workpiece, to produce new measured dimensional values thereof, and
   generating a new error map or look-up table or error function which relates the new measured dimensional values at the changed ambient temperature to the corresponding calibrated values.

16. A method according to claim 12, including storing the reference workpiece in a temperature maintenance device prior to the re-measuring.

17. A method according to claim 16, wherein the temperature maintenance device is a heating device.

18. A method according to claim 16, wherein the temperature maintenance device is a cooling device.

19. A method according to claim 16, including adjusting the temperature maintenance device to adjust the temperature of the reference workpiece to the measured temperature of the further workpiece, to within a predetermined tolerance.

20. A method according to claim 1, including measuring the temperature of a further workpiece of the series, and if it differs from said non-ambient temperature by more than a predetermined tolerance:
   measuring said further workpiece on said measuring apparatus at a non-ambient temperature as a new reference workpiece, to produce measured dimensional values of the new reference workpiece;
   obtaining calibrated values of said dimensional values from a source external to said measuring apparatus; and
   generating a new error map or look-up table or error function which relates said measured dimensional values of the new reference workpiece to the corresponding calibrated values.

21. A method of measuring a series of substantially or nominally identical workpieces, in which each workpiece of the series is received from a manufacturing process and placed on a measuring apparatus that has an ambient temperature, comprising:
   (a) measuring one of said workpieces, or an artefact having a plurality of features the size and shape of which approximate said workpieces, on said measuring apparatus as a reference workpiece, to produce measured dimensional values of the reference workpiece;
   (b) obtaining calibrated values of said dimensional values from a source external to said measuring apparatus; and
   (c) generating an error map or look-up table or error function which relates measured dimensional values of the reference workpiece to the corresponding calibrated values,
   wherein:
      the reference workpiece is measured at a non-ambient temperature that is different from the ambient temperature, and
      the generated error map or look-up table or error function relates to the measured dimensional values at the non-ambient temperature,
   the method further comprising:
      measuring the temperature of a further workpiece of the series, and if it differs from said non-ambient temperature by more than a predetermined tolerance:
      measuring said further workpiece on said measuring apparatus at a non-ambient temperature as a new reference workpiece, to produce measured dimensional values of the new reference workpiece;
      obtaining calibrated values of said dimensional values from a source external to said measuring apparatus; and
      generating a new error map or look-up table or error function which relates said measured dimensional values of the new reference workpiece to the corresponding calibrated values.

22. A method according to claim 12, wherein the temperature of the workpiece is measured by measuring a known or calibrated length of a feature of the workpiece, which provides a reference for temperature by its thermal expansion.

23. A method according to claim 1, including storing the reference workpiece in a temperature maintenance device prior to the measurement at the non-ambient temperature.

24. A method according to claim 23, wherein the temperature maintenance device is a heating device.

25. A method according to claim 23, wherein the temperature maintenance device is a cooling device.

26. A method according to claim 1, wherein the manufacturing process is a cutting process on a machine tool.

27. A method according to claim 1, wherein the non-ambient temperature is hotter than the environmental temperature of the measuring apparatus.

28. A method according to claim 1, wherein the non-ambient temperature is cooler than the environmental temperature of the measuring apparatus.

29. A method according to claim 1, wherein the calibrated values in (b) are obtained by measuring the reference workpiece externally of said measuring apparatus.

30. A method according to claim 29, wherein the calibrated values in (b) are obtained by measuring the reference workpiece on a separate coordinate measuring machine.

31. A method according to claim 1, wherein the calibrated values in (b) are obtained from nominal design values of the dimensions or coordinate points of the reference workpiece.

32. A measuring apparatus configured to perform a method according to claim 1.

33. A software program for measuring apparatus, configured to cause the apparatus to perform a method according to claim 1.

* * * * *